United States Patent [19]
Egner-Walter et al.

[11] Patent Number: 5,165,159
[45] Date of Patent: Nov. 24, 1992

[54] PROCESS FOR PREASSEMBLING A MOTOR VEHICLE WIPER SYSTEM FOR TRANSPORT

[75] Inventors: Bruno Egner-Walter, Heilbronn; Hans Prohaska, Bietigheim-Bissingen; Eckhardt Schmid, Brackenheim, all of Fed. Rep. of Germany

[73] Assignee: SWF Auto Electric GmbH, Bietigheim-Bissingen, Fed. Rep. of Germany

[21] Appl. No.: 572,978

[22] PCT Filed: Nov. 25, 1989

[86] PCT No.: PCT/EP89/01429
§ 371 Date: Jul. 30, 1990
§ 102(e) Date: Jul. 30, 1990

[87] PCT Pub. No.: WO90/06249
PCT Pub. Date: Jun. 14, 1990

[30] Foreign Application Priority Data

Dec. 1, 1988 [DE] Fed. Rep. of Germany ....... 3840501

[51] Int. Cl.⁵ .............................................. B23P 11/00
[52] U.S. Cl. ........................................ 29/434; 29/469; 29/525.1; 15/250.31; 15/250.34
[58] Field of Search .................. 29/434, 464, 469, 559, 29/525.1; 53/428, 446; 15/250 R, 250.31, 250.34

[56] References Cited

U.S. PATENT DOCUMENTS

| | | | |
|---|---|---|---|
| 1,839,175 | 12/1931 | Hueber | 15/250.31 |
| 3,793,671 | 2/1974 | Gebhard | 15/250.27 |
| 3,874,249 | 4/1975 | Carpenter | 74/606 R |
| 4,009,502 | 3/1977 | Tamaki et al. | 15/250.31 |

FOREIGN PATENT DOCUMENTS 2529949 8/1976 Fed. Rep. of Germany.

Primary Examiner—Mark Rosenbaum
Assistant Examiner—David P. Bryant
Attorney, Agent, or Firm—Robert P. Seitter; J. Gordon Lewis

[57] ABSTRACT

A process of assembling a wiper system, in which, in a transport position, the wiper arms are fixed onto the wiper shaft in a simply releasable manner and then the unit, pre-assembled in such a way, is delivered to the manufacturer of motor vehicles. There the wiper arms are swivelled from their transport position into their operational position and are permanently fixed onto the proper wiper shaft. Matching the wiper arms to the wiper system during the transport effectively prevents the manufacturer of motor vehicles from assembling them wrongly.

3 Claims, 3 Drawing Sheets

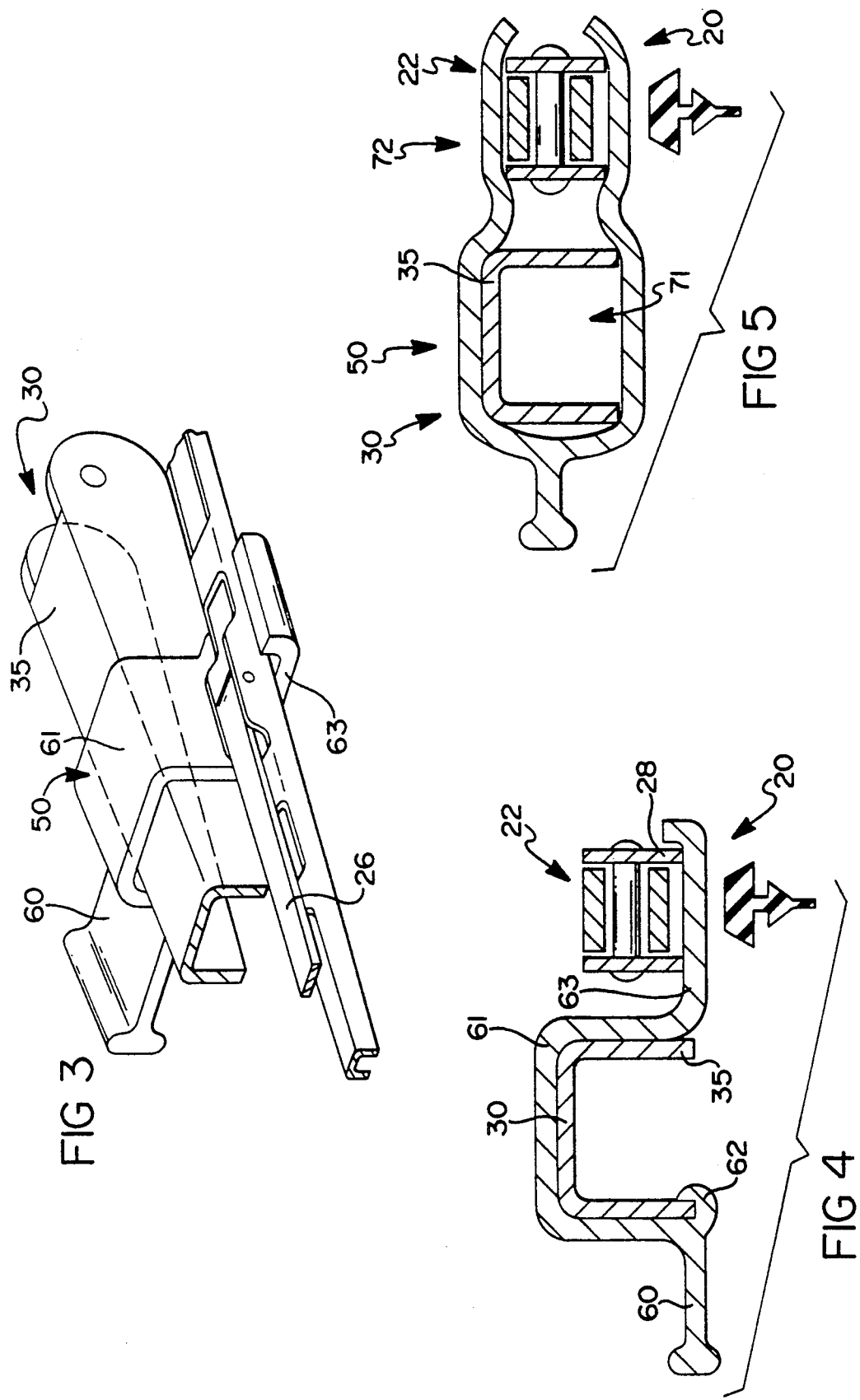

PROCESS FOR PREASSEMBLING A MOTOR VEHICLE WIPER SYSTEM FOR TRANSPORT

TECHNICAL FIELD

The present invention relates to a process of assembling a wiper system as well as to a wiper system for motor vehicles.

BACKGROUND OF THE INVENTION

Normally a wiper system includes a support frame onto which an electric motor is fixed and which, furthermore, carries three bearing bushes for a wiper shaft, each bearing bush being driven by the motor via appropriate gearing elements, namely cranks and push rods. Usually these parts are pre-assembled as a unit by the manufacturer of the wiper system, and the unit is then delivered to the manufacturer of motor vehicles.

A wiper system also includes the wiper arm-and-blade assemblies which can be fastened to the wiper shafts. These wiper arm-and-blade assemblies have a wiper arm and a wiper blade mounted thereto. Each of these parts is also separately delivered to the manufacturer of motor vehicles by the manufacturer of wiper systems and, there, they are mounted onto the car body of the motor vehicle after the assembly of the support frame.

Such assembly of a wiper system to a motor vehicle is awkward. Moreover, there is a danger of assembling it wrongly, if one does not take care—by making increased logistic efforts—to put the parts, which belong together, but have been delivered separately, together again on the assembly line of the motor vehicle. Since in some motor vehicles the left wiper arm-and-blade assembly differs from the right one, for instance the wiper blade on the driver's side often has a spoiler for increasing the pressure, even when making increased logistic efforts mistakes regarding the assembly cannot totally be excluded.

SUMMARY OF THE INVENTION

Therefore the object of the present invention is to provide a process of assembling a wiper system in such a way that—by using easy means—a correct assignment of the separate parts is ensured. Thus a wrong assembly is avoided to a large extent so that operational reliability of the motor vehicle is improved. This object is achieved according to the invention by providing at least the wiper arms, and, if possible, the complete wiper arm-and-blade assemblies, fixed to a member of the wiper system in a transport position that can easily be released. Then the unit combined as such is to be transported to the motor vehicle, where the wiper arms are moved from their transport position into their operational position and are fixed onto the wiper shaft. Thus, in any case, it is ensured that the wiper arms or the wiper arm-and-blade assemblies are mounted onto the respective wiper shafts of the wiper systems.

One embodiment of the present invention provides that the wiper arms are locked within fastening pins which are attached to the support frame of a wiper system. Then the mechanical engineer can assemble the support frame to the car body at the motor vehicle manufacturer's location and can remove the wiper arms from these additional fastening pins and put them onto the wiper shafts. As to such an embodiment, additional, auxiliary elements just require for transport are thus necessary for fixing the wiper arms on the support frame or on another gearing member.

However, a far simpler and cheaper solution is provided by another advantageous embodiment of the invention the wiper arms are directly fixed onto the wiper shafts in a transport position that can easily be released. Thus the wiper arms are pushed, as usual, onto the conical and knurled section of the wiper shaft and the fastening nut, is slightly tightened. Then at the motor vehicle manufacturer's location the fastening nut is loosened to a certain extent so that the wiper arm can easily be moved into the operational position. Afterwards, the fastening nut is tightened again and thus the wiper arm is permanently fixed onto the wiper shaft in the operational position. Thus, without any doubt, the manufacturer of wiper systems can match the wiper arm or the wiper arm-and-blade assembly to the proper wiper shaft.

Since, according to the present invention, the wiper arms or the wiper arm-and-blade assemblies are transported together with the support frame as a pre-assembled unit, it is important to have an arrangement taking little space. This is achieved by the present invention. Thus in parallel wiper systems, in which the wipers are swivelled to at least approximately parallel positions, the wiper arms are fixed in the transport position in such a way that they, starting from the wiper shafts, point in opposite directions and thus lie beside each other.

Since usually the wiper arms comprise two parts resiliently supported against each other, namely the fastening member and the linking member, their position must be secured during the transport. Of course, for this purpose the support frame could be formed in a special way so that the wiper arms can directly be supported on it. However, this would mean increased costs for tooling to achieve the necessary changes in the support frame.

Therefore an embodiment with a transport auxiliary element is preferred, which transport auxiliary element ensures the position of the wiper arm-and-blade assemblies in the transport position only during the transport. This transport auxiliary element accomplishes two functions; it receives the force exerted by the pressure spring of the wiper arm in such a way that the wiper lip of the wiper blade mounted to the wiper arm is prevented from permanent deformation. Therefore, the transport auxiliary element is formed in such a way that the wiper blade is prevented from being swivelled during the transport. Furthermore, the transport auxiliary element helps save space, for it is formed in such a way that the wiper arms are more or less parallel to the frame.

The invention also relates to a wiper system to be assembled to a motor vehicle, in which in the transport position as opposed to the operational position, the wiper arms or the wiper arm-and-blade assemblies are fixed to a part of the wiper system, preferably to the respective wiper shafts, in a simply releasable way. A transport auxiliary element securing the position of the wiper arms or of the wiper arm-and-blade assemblies in the transport position is provided by this wiper system. As to an especially preferred embodiment, in which the wiper system comprises a support frame formed as a tubular frame, this transport auxiliary element is to be supported on the one hand on this tubular frame and on the other hand, on a gearing member, preferably on a push rod.

BRIEF DESCRIPTION OF THE FIGURES

The invention and advantageous embodiments thereof are illustrated in the accompanying drawing, in which:

FIG. 3 is a perspective partial view of a wiper system with another transport auxiliary element, FIG. 4 is a cross-section of FIG. 3 and FIG. 5 is a cross-section similar to FIG. 4 showing another embodiment of a transport auxiliary element.

DETAILED DESCRIPTION OF THE INVENTION

Figure 1:
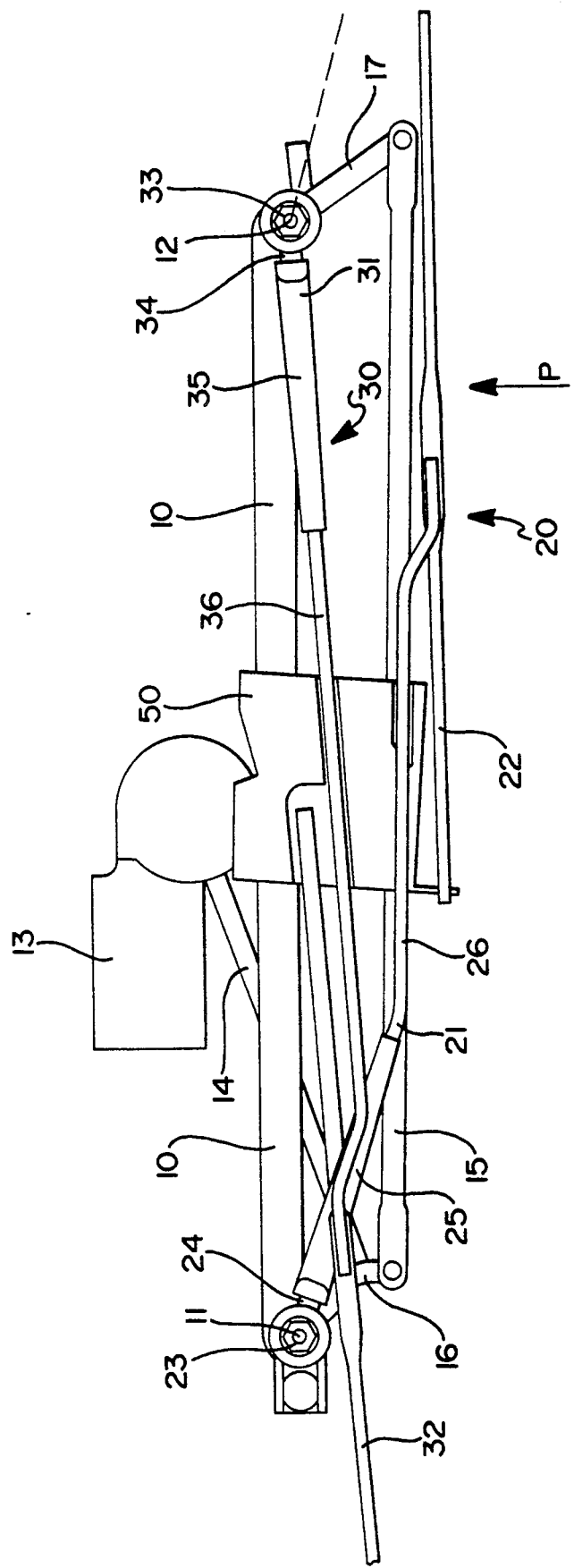
FIG. 1 is a side view of a wiper system.

The wiper system shown in FIG. 1 includes a support frame 10 constructed as a tube, which support frame 10 at both ends, as is usually known, carries a bearing bush each with a wiper shaft 11, 12 guided in it. An electric motor 13 is also fixed onto this support frame 10 by way of a fastening metal sheet, which electric motor 13 drives these wiper shafts in pendulum-motion via gearing members, namely via a motor crank (not illustrated) as well as via push rods 14, 15 and swivelling levers 16, 17.

A wiper arm-and-blade assembly 20, 30 is fixed onto each wiper shaft. Each wiper arm-and-blade assembly 20, 30 includes a wiper arm 21, 31 as well as a wiper blade 22, 32 mounted onto the free end of this arm.

The wiper arms 21, 31 are fixed onto the wiper shafts 11, 12 in a known manner. The wiper shaft includes a conical and knurled fastening section, and adjacent thereto, a thread section onto which the fastening nut 23, 33 is screwed. Each wiper arm 21, 31 comprises a fastening member 24, 34 with a conical bore which is put onto the conical and knurled fastening section of the wiper shaft. By tightening the fastening nut 23, 33 a connection protected against twisting between the wiper arm-and-blade assembly 20, 30 and the matching wiper shaft 11, 12 is achieved in a known way. Arrangements of this kind are delivered in large numbers so that further explanations and drawings with respect to the way the wiper arm-and-blade assembly is fixed onto the wiper shaft can be omitted.

For the present invention it is important that in a transport position the manufacturer of the wiper system fixes the wiper arms 21, 31 to a part of the wiper system, namely directly onto the wiper shaft 11, 12, in a simply releasable way. The wiper arms are attached to the corresponding wiper shafts and the fastening nuts 23, 33 are slightly tightened. Then the unit, pre-assembled as shown in FIG. 1, is delivered to the manufacturer of motor vehicles who assembles the wiper system to the motor vehicle. Thus, the fastening nuts 23 and 33 are loosened only to such an extent that these wiper arms or wiper arm-and-blade assemblies can be swivelled out of the transport position into the operational position. Thereby wiper arm-and-blade assembly 30 has to be swivelled around a relatively large angle into the position indicated by dotted lines, whereas the other wiper arm-and-blade assembly 20 has to be swivelled around a relatively small angle and has to be adjusted in such a way that the wiper blade is substantially parallel to the lower border of the windshield.

Then in the operational position of the wiper arm-and-blade assemblies the fastening nuts 23, 33 are firmly tightened so that the wiper arms 21, 31 are permanently fixed to these wiper shafts 11, 12.

FIG. 1 shows that the wiper arms 21, 31 in the transport position as illustrated are fixed onto the wiper shaft 11, 12 in such a way that they, starting from these wiper shafts 11, 12, point in opposite directions. Thus, they lie next to each other in a position, which later during operation is not achieved if it is a parallel wiper system. Furthermore FIG. 1 shows that the wiper blades 22, 32 are already mounted to the wiper arms 21, 31. Most of the time this will be the case. However, there are also exceptions, in which the wiper blades are delivered by another supplier. In such a case, the present invention at least reduces the effort of the assembly at the motor vehicle manufacturer's location because the wiper arms are already pre-assembled to the support frame when delivered.

The wiper arms that are common nowadays include a fastening member 24, 34, onto which a linking member 25, 35 is swivellably mounted, onto which linking member 25, 35 the wiper rod 26, 36 is fixed. The linking member 25, 35 is supported on the fastening member via a pressure spring in such a way that the wiper blade is pressed against the windshield to be cleaned. When such arrangements have an element between the fastening member 24, 34 and the linking member 25, 35, the wiper arm-and-blade assemblies cannot be fixed in a stable way during the transport just by the fastening nut 23, 33. Therefore, a transport auxiliary element 50 is provided, which transport auxiliary element 50 is supported on a part of the wiper system; on the one hand, on the support frame 10 and, on the other hand, on a gearing member, namely on the push rod 15. This transport auxiliary element secures the position of the wiper arm-and-blade assemblies in the transport position and simultaneously separates the wiper blades so that no lasting deformations of the wiper lips can result.

Figure 2:
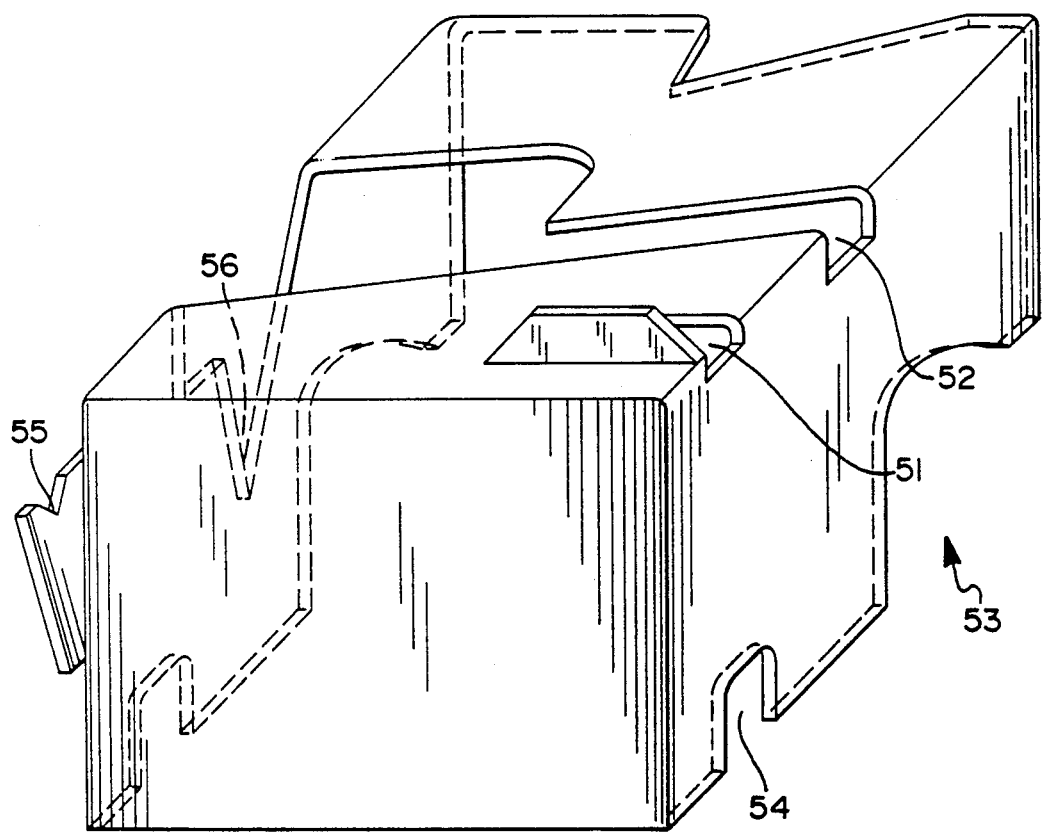
FIG. 2 is a perspective view of a transport auxiliary element.

As to the embodiment shown in FIG. 1, a transport auxiliary element 50 is used which is folded from a stable carton and is illustrated in a perspective view in FIG. 2. This transport auxiliary element is a box-like component having securing receivers 51, 52 for each wiper arm 21, 31 or for each wiper rod 26, 36. On the side opposite these securing receivers 51, 52 this box-like transport auxiliary element 50 has a first supporting receiver 53 with a contour that is at least partly adapted to that of the support frame 10. Next to it the transport auxiliary element 50 has a second supporting receiver 54 with a contour adapted to that of the push rod 15. Thus, this transport auxiliary element 50 is fixed either between support frame 10 or push rod 15 and the wiper rods 26, 36 lying in securing receivers. Moreover, this transport auxiliary element 50 includes holding receivers 55 and 56 with a contour that is adapted to that of the wiper lip of the wiper blade 22, 32. These holding receivers 55, 56 protect the wiper blades 22, 32 against twisting with respect to the wiper arms 21, 31.

As shown in FIGS. 3, 4 and 5 further embodiments of possible transport auxiliary elements are explained. FIG. 3 shows a perspective partial view approximately in the direction of Arrow P in FIG. 1. Thus, FIGS. 3 and 4 make clear that the transport auxiliary element 50 connects the two wiper arm-and-blade assemblies 20, 30 with each other without any support on the support frame. This transport auxiliary element 50 has a handle 60, and adjacent thereto, a first section 61 in the shape of a "U" which grasps the linking member 35 of the wiper arm-and-blade assembly 30 and which is held on this linking member by a locking shoulder 62 so that it is protected against twisting. The first section 61 in the shape of a "U" is followed by an extension arm 63 engaging under the carrier yoke 28 of the wiper blade 22 of the other wiper arm-and-blade assembly 20. Thereby an embodiment is preferred in which this extension arm 63 engages underneath the other wiper blade 22 at the linking point of the wiper rod 26 so that the extension arm 63 simultaneously prevents the other wiper blade 22 from twisting. Thus the transport auxiliary element 50 according to FIGS. 3 and 4 secures the relative position between the two wiper arm-and-blade assemblies directly on a support frame or a gearing member without any support.

Nearly the same can be stated with respect to FIG. 5. In this case the transport auxiliary element 50 is formed in the shape of a cramp, whereby a first section of the cramp 71 grasps the linking member 35 of the wiper arm-and-blade assembly 30 and a second section of the cramp 72 grasps the carrier yoke system of the wiper blade 22 of the other wiper arm-and-blade assembly 20, preferably again on the linking point.

Thus, as to the embodiments shown in FIGS. 3 to 5, the transport auxiliary element 50 ensures that the two wiper arm-and-blade assemblies are arranged approximately in a direction parallel to each other in a plane that is perpendicular to the wiper shafts. Thus a unit is provided, which unit takes little space and can also be easily transported. The transport auxiliary elements illustrated can be produced at low cost and can be re-used several times.

What is claimed is:

1. A process for preassembling a motor vehicle wiper system having first and second wiper arms mounted on first and second wiper shafts, respectively, and first and second fastening means for fixing said first and second wiper arms to said first and second wiper shafts, respectively, said process comprising the steps of:

maintaining said first and second fastening means loose, so that said first and second wiper arms are loosely mounted on said first and second wiper shafts, respectively;

providing an auxiliary transport element adapted to engage selected components of said motor vehicle wiper system;

orienting said first wiper arm in a first desired transport position corresponding generally to the operational position of said first wiper arm when installed on a motor vehicle and said second wiper arm in a second desired transport position generally opposite to the operational position of said second wiper arm when installed on a motor vehicle; and installing said auxiliary transport element in said motor vehicle wiper system to engage said selected components and fix the relative positions of said selected components.

2. A process according to claim 1 wherein said motor vehicle wiper system further includes first and second wiper blades which, together with said first and second wiper arms, respectively, form first and second wiper arm-and-blade assemblies, respectively, and said auxiliary transport element is installed to engage said first and second wiper arm-and-blade assemblies.

3. A process according to claim 1 wherein said motor vehicle wiper system further includes a support frame and said auxiliary transport element is installed to engage said support frame.

* * * * *